Sept. 11, 1928.

D. F. MINER 1,684,065

ELECTRICAL MEASURING INSTRUMENT

Filed May 7, 1924

WITNESSES:
S. H. Voelker.
E. R. Evans

INVENTOR
Douglas F. Miner.
BY
Wesley G. Carr
ATTORNEY

Patented Sept. 11, 1928.

1,684,065

UNITED STATES PATENT OFFICE.

DOUGLAS F. MINER, OF EAST PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed May 7, 1924. Serial No. 711,552.

My invention relates to electrical measuring instruments and particularly to instruments for measuring the maximum and the effective values of relatively high alternating voltages.

One object of my invention is to provide an instrument of simple construction that shall be adapted to the measurement of both the maximum and the effective values of an alternating voltage.

Another object of my invention is to provide electrical measuring apparatus that shall be adapted to be associated with the insulating bushing and static shield of a high-voltage transformer for measuring the terminal voltage.

High-voltage, oil-immersed transformers are provided with an insulating bushing for each terminal that projects through the wall of the tank or container. This bushing is ordinarily provided with a static shield at its outer end. In some cases, the transformer has only one insulated terminal, the other terminal being grounded to the tank. It is a difficult problem to measure accurately the terminal voltage of a transformer of this type when this voltage is above 50,000 volts. Various methods have been proposed for this purpose, but these methods have been either complicated or inaccurate at these high potentials. Furthermore, these methods have involved modification or rearrangement of the transformer windings or terminal construction.

In accordance with my invention, means is provided for accurately measuring both the maximum and the effective values of high voltages, the structure being relatively simple. Furthermore, my invention is applicable to existing installations. When applied to a transformer it involves no change of the transformer structure and is not conductively connected to the windings thereof. By slight variations in proportions it may be utilized over a wide range of voltages.

My invention may be readily comprehended from the accompanying drawings which disclose one embodiment thereof.

Figure 1:
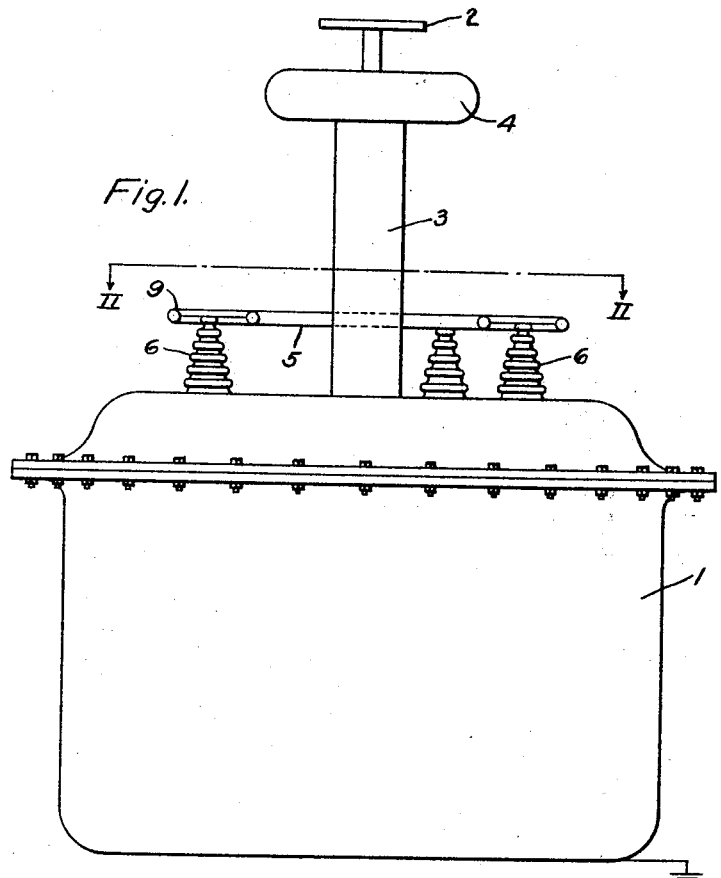
Figure 2:
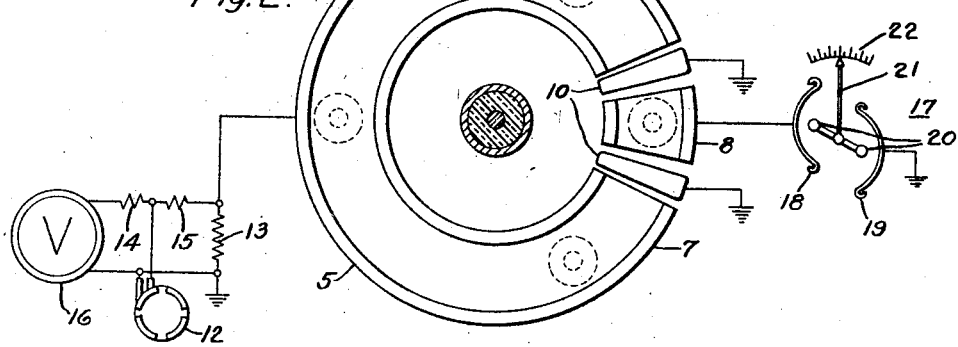

In the accompanying drawings,

Figure 1 is a view in elevation of a high voltage transformer provided with voltage measuring apparatus in accordance with the present invention; and Figure 2 is a diagram of the circuit of the voltage measuring apparatus.

Referring to Figure 1, a high-voltage transformer comprises a grounded casing 1 having a terminal 2, that is insulated from the casing by an insulating bushing 3. A static shield 4 for the terminal 2 is positioned at the end of the bushing. This shield serves to reduce the potential gradient in the air at this point and to produce a uniform electrostatic field around the bushing.

A condenser element consisting of a metallic plate 5 is supported on insulators 6 carried by the tank. As shown in Fig. 2, the plate 5 is divided into two sections 7 and 8. The edges of the plate 5 are rounded, as shown at 9, in order to prevent the formation of corona discharge in the air at this point.

The grounded tank 1 and the static shield 4 form a condenser. The plate 5 is interposed between these two condenser elements and is therefore at an intermedate potential, which is an invariable fraction of the terminal voltage. As shown, the plate 5 is closer to the top of the tank 1 than to the static shield 4, and the effective area of the latter is less than that of the former, so that the capacity between the plate 5 and the tank 1 is much larger than the capacity between the plate 5 and the shield 4. Accordingly, the potential difference between the plate 5 and the tank 1 is a small fraction of that between the static shield 4 and the tank 1, the latter being the terminal voltage. Thus a condenser type of multiplier is provided. It will be apparent that, by varying the relationship of the plate 5 with respect to the tank and the static shield, the structure may be adapted for use over a wide range of voltages, and that there is practically no upper limit to the voltage that may be measured.

Two grounded metallic members 10 are interposed between the sections of the plate 5 to shield each from the other. The larger section 7 of the plate 5 is connected to a crest or maximum voltage indicating device comprising a synchronous commutator 12, resistors 13, 14, and 15 and a voltmeter 16. The voltmeter 16 is actuated in accordance with the charging current taken by the condenser formed by the shield 4 and the plate 7, which is dependent upon the maximum value of the voltage applied to the condenser. This value is proportional to the terminal voltage. The detailed construction and the theory of operation of a crest voltmeter of this type are set forth in U. S. Patent No. 1,186,765, issued June 13, 1916, to C. L. Fortescue.

A static voltmeter 17, which may be of either the repulsion or attraction type, is connected to the smaller portion 8 of the plate 5. As shown, the voltmeter is of the usual construction and comprises two plates 18 and 19, and pivoted vanes 20. The vanes 20 are attracted by the plates 18 and 19 when a voltage is applied to the instrument because of the induced electro-static charges. A pointer 21 that is attached to the movable vanes 20 indicates upon a scale 22 the effective or root-mean-square value of the applied voltage. It will be seen, therefore, that the instrument 16 indicates the maximum voltage of the terminal 2 and the instrument 17 simultaneously measures the effective value of the same voltage.

Since the crest voltmeter requires a certain minimum charging current for satisfactory operation, it is preferable to utilize the major portion 7 of the plate 5 for this instrument. The static voltmeter 17 requires no appreciable charging current and hence is connected to the minor portion of the plate 5. The two sections of the plate 5 have no effect on each other because of the interposed shields 10.

It will be apparent that I have provided a relatively simple system for measuring both the maximum and the effective values of alternating voltages. It is adapted to very high voltages and may be readily added to existing installations, since it requires no modification or change of the transformer or bushing structure.

It should be understood that while I have illustrated my invention in connection with a transformer having a single terminal provided with a static shield it may be applied also to other types of electrical apparatus and to other arrangements of terminals.

I do not consider that my invention is limited to the precise construction shown and described and I do not wish to be limited in scope except as set forth in the appended claims.

I claim as my invention:

1. A measuring system comprising a sectional condenser element, and means connected to said element adapted to indicate both the maximum and effective values of the applied voltage.

2. A measuring system comprising a sectional condenser element, and means connected to separate sections of said element adapted to indicate simultaneously the maximum and effective values of the applied voltage.

3. In combination, an insulating bushing, a static shield at one end thereof, a divided metallic member spaced from said shield in such manner that they form an electrostatic condenser having an air dielectric, and maximum and effective voltage responsive devices connected to the respective portions of said divided member.

4. In combination, a grounded container, an insulating bushing extending through the wall of said container and provided with a terminal and static shield at the outer end thereof, and means including a conducting member interposed between said shield and container for measuring the maximum and the effective values of the terminal voltage.

5. A system of high-voltage measurement comprising an air condenser disposed in an electrostatic field, said air condenser having a plurality of sections, means associated with one of said sections for indicating the maximum value of said voltage and means associated with another of said sections for indicating the effective value of said voltage.

6. A system of high-voltage measurement comprising an air condenser disposed in an electrostatic field, said air condenser having a plurality of sections, a repulsion voltmeter associated with one of said sections for indicating the effective value of said voltage and a crest voltmeter associated with another of said sections for indicating the maximum value of said voltage.

7. A system of high-voltage measurement comprising an air condenser mounted on the casing of a transformer in the electrostatic field of the terminal bushing, said air condenser consisting of a plurality of sections, and means associated with said sections for measuring a plurality of voltage characteristics.

8. A system of high-voltage measurement comprising an air condenser mounted on the casing of a transformer in the electrostatic field of a terminal bushing, said air condenser consisting of circular plate having a plurality of sections, a crest voltmeter in circuit relation with one of said sections, and a static voltmeter in circuit relation with another of said sections.

In testimony whereof, I have hereunto subscribed my name this 25th day of April, 1924.

DOUGLAS F. MINER.